(12) United States Patent
Nixon

(10) Patent No.: US 12,728,787 B1
(45) Date of Patent: Sep. 8, 2026

(54) HOUSING UNIT FOR STRAP

(71) Applicant: Matt Nixon, Aberdeen, SD (US)

(72) Inventor: Matt Nixon, Aberdeen, SD (US)

( * ) Notice: Subject to any disclaimer, the term of this patent is extended or adjusted under 35 U.S.C. 154(b) by 0 days.

(21) Appl. No.: 18/764,586

(22) Filed: Jul. 5, 2024

(51) Int. Cl.
*B60P 7/08* (2006.01)

(52) U.S. Cl.
CPC .................................. *B60P 7/0846* (2013.01)

(58) Field of Classification Search
CPC .................................................... B60P 7/0846
See application file for complete search history.

(56) References Cited

U.S. PATENT DOCUMENTS 3,954,226 A * 5/1976 Pickering .............. B60P 7/0846 242/395
4,510,652 A * 4/1985 van Iperen .............. B60P 7/083 410/101
5,433,565 A * 7/1995 Chan ..................... B60P 7/0853 74/544
5,611,520 A 3/1997 Soderstrom
6,068,210 A * 5/2000 Risa ....................... B65H 75/28 242/395
6,350,088 B1 * 2/2002 Priester ................... B60P 7/083 410/104
6,626,621 B1 * 9/2003 Hugg ...................... B60P 7/083 410/106
6,824,339 B1 * 11/2004 Childers ................ B61D 45/00 16/110.1
6,966,543 B2 * 11/2005 Loudamy .............. B60P 7/0853 254/223
7,464,916 B1 * 12/2008 Drinkhorn ............. B61D 45/00 74/545
7,766,271 B1 * 8/2010 Confoey ............... B60P 7/0846 242/395
7,845,621 B1 * 12/2010 Lu .......................... B66F 3/005 254/218
9,878,654 B2 1/2018 Martinsen
D845,727 S * 4/2019 Haynes ............................ D8/44
11,945,668 B2 * 4/2024 Jones .................... B60P 7/0846
2005/0092862 A1 * 5/2005 Treat ..................... B60P 7/0846 242/395
2006/0022104 A1 * 2/2006 Treat ..................... B60P 7/0846 248/300
2020/0377003 A1 * 12/2020 Egigian ................. B60P 7/0846
2021/0197705 A1 * 7/2021 Taschereau .......... B65H 18/085
2022/0161708 A1 * 5/2022 Chou ...................... B60P 7/083

* cited by examiner

*Primary Examiner* — David M Upchurch
(74) *Attorney, Agent, or Firm* — Sanchelima & Associates, P.A.; Christian Sanchelima; Jesus Sanchelima

(57) ABSTRACT

A housing unit for strap includes a housing assembly, a crank assembly, and a handle assembly. The housing assembly includes a housing with a clip or a clamp attached thereto. The crank assembly includes a crank and an axle with a slot to tie down a ratchet strap therein. The crank allows the ratchet strap to roll up on the axle. The handle assembly includes a reel handle removably attached to the axle. The clamp allows securing the housing assembly on tight straps.

2 Claims, 3 Drawing Sheets

HOUSING UNIT FOR STRAP

BACKGROUND OF THE INVENTION

1. Field of the Invention

The present invention relates to strap housings and, more particularly, to a housing unit for strap that has a strap housing, a crank mechanism and a clip to prevent strap tails coming untied and getting pulled over.

2. Description of the Related Art

Several designs for strap housing have been designed in the past. None of them, however, include a housing unit for strap including a strap housing with a crank mechanism to roll up a ratchet strap therein.

Applicant believes that a related reference corresponds to U.S. Pat. No. 9,878,654 issued for a tie down bundle securing device for attaching a looped bundle of tie down strap to a tensioned tie down strap. The device may include a first support member for placement below the tensioned tie down strap extending from a first frame portion in a first direction, and a second support member for placement on the looped bundle extending in the first direction. Applicant believes that another related reference corresponds to U.S. Pat. No. 5,611,520 issued for a strap collector designed to be attached to a connecting arm of a cargo tightener. None of these references, however, teach of a housing unit for strap including a housing plate having a u-shaped cross section, a slotted axle traversing both vertical sides of the housing plate, and a reel handle which may be removably attached to the slotted axle. The outer face of the housing plate includes a biasing clamp or clip, the device may be useful for providing a tiedown strap retainer.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a housing unit for strap that stores the tail of a ratchet strap that is holding a load down on a trailer.

It is another object of this invention to provide a housing unit for strap that has a handle and a crank that allows a user to easily roll up the unused strap.

It is still another object of the present invention to provide a housing unit for strap that makes trailers look professional and neat, preventing strap tails coming untied and getting pulled over and ticketed.

It is yet another object of the present invention to provide a housing unit for strap with different sizes that can be used for motorcycles, atv, car trailers, and semi trailers.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
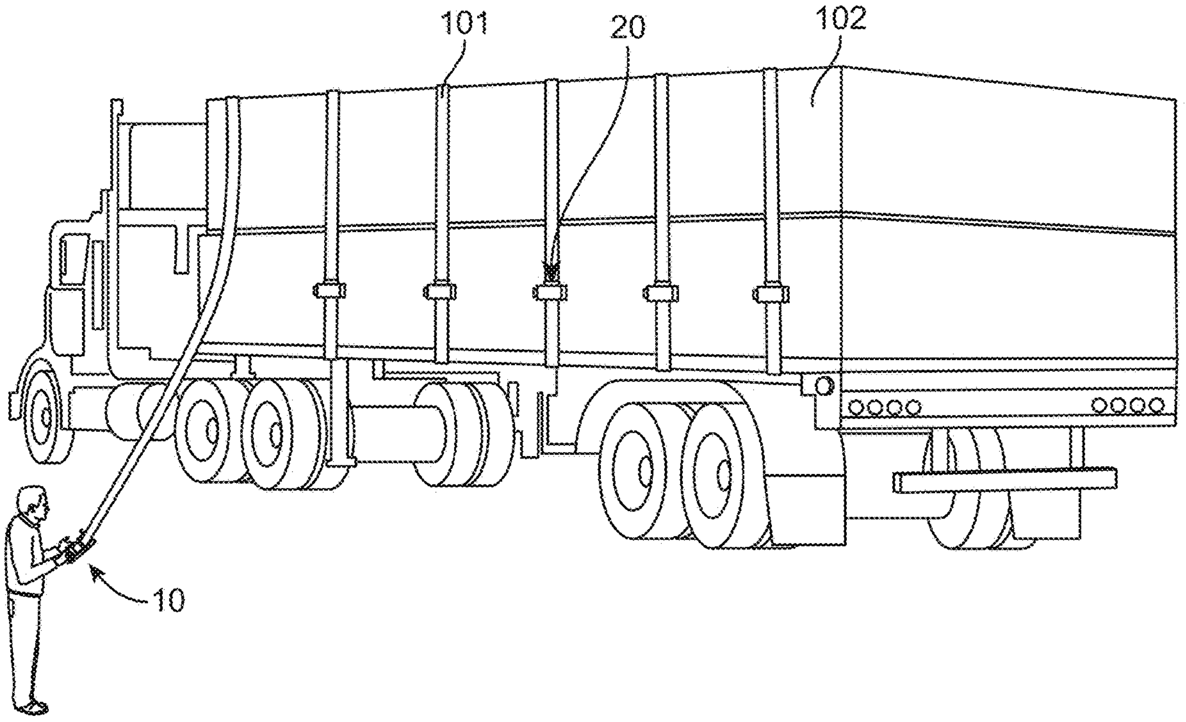
FIG. 1 represents an isometric operational view of the present invention 10 showing a user rolling the unused strap 101.

Referring now to the drawings, where the present invention is generally referred to with numeral 10, it can be observed that it basically includes a housing strap 20, a crank assembly 40, and a handle assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
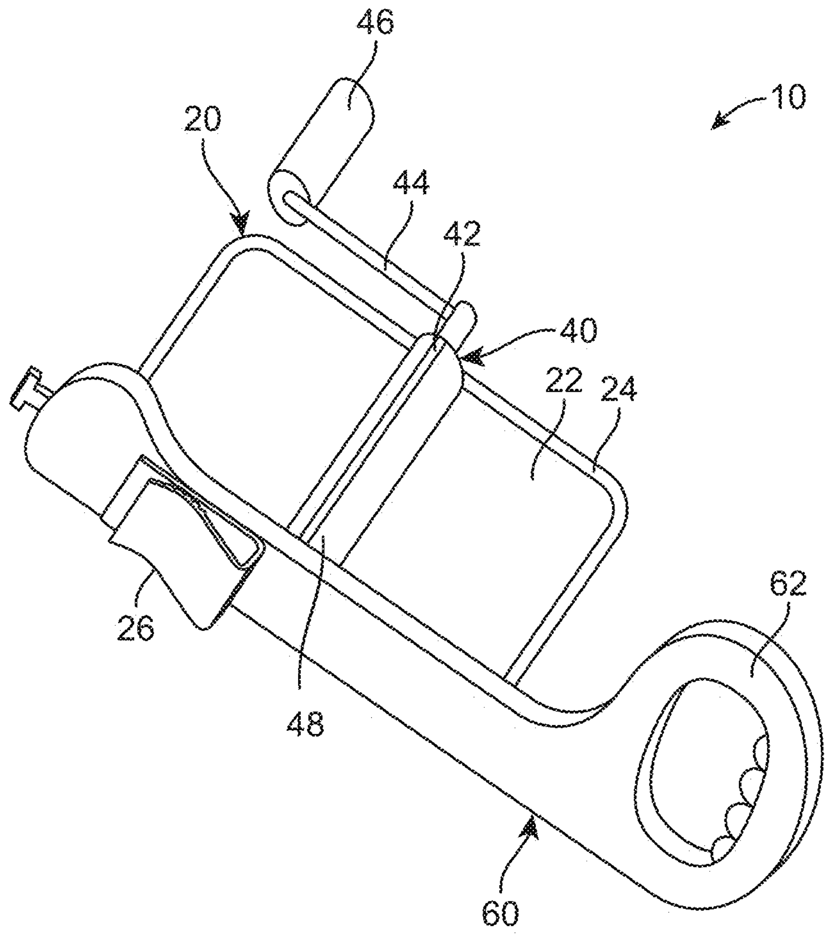
FIG. 2 shows an isometric view of the present invention 10 showing the housing strap 20 with the crank assembly 40 and the handle assembly 60.
Figure 3:
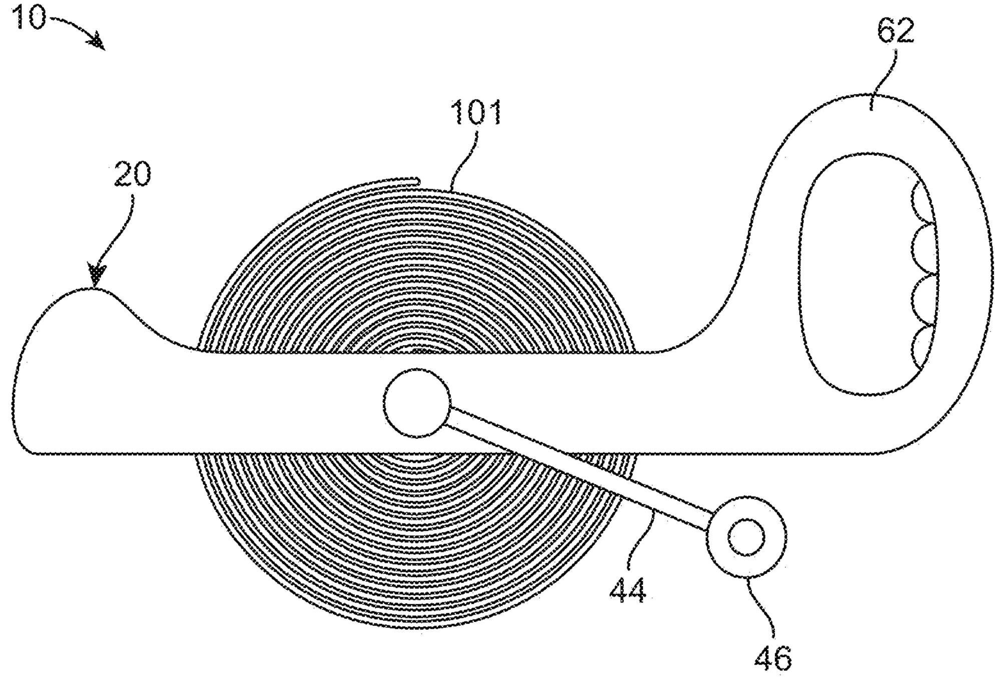
FIG. 3 illustrates a lateral view of the present invention 10.

Best observed in FIG. 2, the housing strap 20 includes a housing 22 with walls 24. In one embodiment, the housing 22 may have a substantially rectangular shape with rounded corners. In other embodiments, the housing 22 may have other shapes such as but not limited to triangular, circular, polygonal, or the like. The walls 24 may be located around an entire perimeter of the housing 22. The walls 24 may be vertical walls. The walls 24 may be perpendicular to the housing 22, thereby defining a housing 22 with a u-cross section. In one of the preferred embodiments, the housing 22 may be made of a hard plastic. It also may be suitable to have the housing 22 made of other materials such as stamped steel or other suitable metal. In one embodiment, the housing 22 may have a length of eight inches, a height of six inches, and a width of four inches. It should be understood that the housing 22 may have any other suitable size. The width of the housing 22 may depend on the size of the strap.

The housing strap 20 may further include a clip 26 or a clamp to removably secure the housing 22. The clip 26 may be of a durable material such as metal or a high-strength polymer. The clip 26 may feature teeth, grooves, or other gripping surfaces to prevent the strap from slipping. The clip 26 may be attached to an outer face of the housing 22. It also may be suitable to attach the clip 26 to the handle assembly 60.

The crank assembly 40 may include an axle 48 traversing two of the walls 24. The axle 48 may be pivotally attached to the walls 24. In one of the preferred embodiments, the axle 48 may have a substantially cylindrical shape. It also may be suitable to have the axle 48 with other shapes. The axle 48 may have a slot 42 along an entire length thereof, thereby defining a slotted axle. The slot 42 may be designed to accommodate and retain the strap 101, allowing the strap 101 to be roll up around the axle 48. The slotted axle may receive a strap 101 therein. The axle 48 may be made of a plastic or a suitable metal. The crank assembly 40 may further include a lever 44 with a knob 46. The lever 44 may be mechanically connected to the axle 48. The lever 44 may be perpendicular to the axle 48. The knob 46 may be perpendicularly attached to the lever 44. The knob 46 may have a substantially cylindrical shape. It also may be suitable to have the knob 46 with other shapes. The knob 46 may be ergonomic for comfortable and efficient operation. The lever 44 may allow the rotation of the axle 48 to facilitate the winding and tightening of the strap 101.

The handle assembly 60 includes a handle 62. The handle 62 may be removably attached to the axle 48. It also may be suitable to removably attach the handle 62 to the housing 22. The handle 62 may be an ergonomic handle for comfort of the user. The handle 62 may be a reel handle capable of having a length adjusting mechanism as known in the art to adjust the length of the handle. A strap 101 of a trailer may be housed in housing 22. The strap 101 may be a ratchet strap of a trailer. The housing 22 may house an extra strap portion of a cargo in a trailer. The user may insert the end of the strap 101 into the slot 42 to tie up the strap 101 to the axle 48. The user may use the knob 46 and lever 44 to spin the axle 48 to roll up the strap 101 on the axle 48. The crank assembly 40 may be used to tighten the strap 101. The clip 26 may be used to secure the housing strap 20 to the tight strap once the excess of strap is rolled up on the axle 48.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A housing unit for strap, comprising:

a. a housing assembly including a clip and housing having a u-shaped cross section, wherein the clip is connected to an outer face of the housing, wherein said housing has a rectangular shape with rounded corners, said housing has vertical walls perpendicularly connected to a perimeter thereof, said housing is made of plastic;

b. a crank assembly including an axle traversing the vertical walls of the housing, said axle has a cylindrical shape, said axle has a slot along an entire length thereof defining a slotted axle, said crank assembly further includes a lever and a knob, said lever is perpendicularly attached to said axle, said knob is attached to said lever, the crank assembly is configured to tie down and retain a strap; and c. a handle assembly including a reel handle removably attached to the axle.

2. A housing unit for strap, consisting of:

a. a housing assembly including a clip and housing having a u-shaped cross section, wherein the clip is connected to an outer face of the housing, wherein said housing has a rectangular shape with rounded corners, said housing has vertical walls perpendicularly connected to a perimeter thereof, said housing is made of plastic;

b. a crank assembly including an axle traversing the vertical walls of the housing, said axle has a cylindrical shape, said axle has a slot along an entire length thereof defining a slotted axle, said crank assembly further includes a lever and a knob, said lever is perpendicularly attached to said axle, said knob is attached to said lever, the crank assembly is configured to tie down and retain a strap; and c. a handle assembly including a reel handle removably attached to the axle.

* * * * *